(12) United States Patent
Mathiak et al.

(10) Patent No.: US 9,790,934 B2
(45) Date of Patent: Oct. 17, 2017

(54) PUMP PULSATION DISCHARGE DAMPENER WITH CURVED INTERNAL BAFFLE AND PRESSURE DROP FEATURE CREATING TWO INTERNAL VOLUMES

(75) Inventors: Gregg M. Mathiak, Plano, TX (US); Ray D. Kelm, Danbury, TX (US); John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 266 days.

(21) Appl. No.: 13/544,734

(22) Filed: Jul. 9, 2012

(65) Prior Publication Data
US 2013/0008512 A1   Jan. 10, 2013

Related U.S. Application Data

(60) Provisional application No. 61/505,451, filed on Jul. 7, 2011.

(51) Int. Cl.
*F04B 11/00*   (2006.01)
*F04B 39/00*   (2006.01)
(Continued)

(52) U.S. Cl.
CPC .......... *F04B 11/00* (2013.01); *F04B 11/0008* (2013.01); *F04B 11/0091* (2013.01);
(Continued)

(58) Field of Classification Search
CPC .............. F04C 15/0049; F04B 39/0055; F04B 11/0025; F04B 39/033; F04B 39/0038;
(Continued)

(56) References Cited

U.S. PATENT DOCUMENTS

| 981,584 A | * | 1/1911 | Miller | 181/253 |
| 1,157,256 A | * | 10/1915 | Schmitt | 181/280 |

(Continued)

OTHER PUBLICATIONS

Notification of Transmittal of the International Search Report and the Written Opnion of the International Searching Authority, or the Declaration dated Oct. 12, 2012 in connection with International Patent Application No. PCT/US12/45977.

(Continued)

*Primary Examiner* — Alexander Comley

(57) ABSTRACT

A pulsation control device coupling a reciprocating pump with either suction or discharge piping and having a generally spherical or cylindrical interior chamber includes a curved baffle with a pressure drop device (e.g., a choke) separating the interior chamber into two volumes and forcing fluid flow through the pressure drop device. The effective fluid passage provided by the pressure drop device is smaller than the fluid passage for one or both of the inlet to and/or the outlet from the interior chamber. Fluid entering the pulsation control device reacts with fluid contained within the volume thereof on both sides of the baffle. The baffle attenuates pressure pulses within fluid passing through the interior chamber in response to operation of the reciprocating pump. The pressure drop device dampens high frequency pulsation magnitudes of pressure pulses within fluid passing through the interior chamber in response to operation of the reciprocating pump.

20 Claims, 2 Drawing Sheets

(51) Int. Cl.
*F16L 55/04* (2006.01)
*F04B 53/00* (2006.01)

(52) U.S. Cl.
CPC ........ *F04B 39/0055* (2013.01); *F04B 53/001* (2013.01); *F16L 55/04* (2013.01); *Y10T 137/0318* (2015.04); *Y10T 137/7781* (2015.04)

(58) Field of Classification Search
CPC .............. F04B 39/0027; F04B 11/008; F04B 11/0091; F04B 11/00; F04B 53/001; F01N 1/083; F16L 155/04–155/045; F16L 55/04–55/045
USPC ............ 417/540; 220/720; 138/26; 181/233
See application file for complete search history.

(56) References Cited

U.S. PATENT DOCUMENTS

| | | | |
|---|---|---|---|
| 2,222,876 A | 11/1940 | McCurdy | |
| 2,851,058 A * | 9/1958 | Rumsey | F04B 11/0091 138/26 |
| 2,993,559 A * | 7/1961 | Everett | F01N 1/06 181/268 |
| 3,015,345 A * | 1/1962 | Michael | F15B 1/24 138/31 |
| 3,114,430 A * | 12/1963 | Gallagher | 181/254 |
| 3,141,519 A * | 7/1964 | Bottum | 181/241 |
| 3,148,745 A * | 9/1964 | Jones | 181/233 |
| 3,219,141 A * | 11/1965 | Williamitis | 181/269 |
| 3,220,506 A * | 11/1965 | Vernet | F01N 3/00 181/260 |
| 3,385,396 A * | 5/1968 | Morris | 181/233 |
| 3,419,029 A * | 12/1968 | Straub | 128/205.24 |
| 3,515,241 A * | 6/1970 | Jones | 181/268 |
| 3,731,709 A * | 5/1973 | Glover | F16L 55/04 138/26 |
| 3,874,417 A * | 4/1975 | Clay | 138/30 |
| 4,032,265 A * | 6/1977 | Miller | F04B 11/0016 137/565.34 |
| 4,203,503 A * | 5/1980 | Franco et al. | 181/272 |
| 4,209,076 A * | 6/1980 | Franco et al. | 181/272 |
| 4,265,274 A | 5/1981 | Zahid | |
| 4,368,799 A | 1/1983 | Wagner | |
| 4,424,882 A * | 1/1984 | Moller | 181/231 |
| 4,514,151 A * | 4/1985 | Anders | F04B 11/0016 138/26 |
| 4,557,349 A | 12/1985 | Crump | |
| 4,585,400 A * | 4/1986 | Miller | F16L 55/05 137/565.34 |
| 4,679,597 A * | 7/1987 | Stein | F16L 55/02772 138/26 |
| 4,809,812 A * | 3/1989 | Flugger | 181/268 |
| 4,934,482 A * | 6/1990 | Herron et al. | 181/224 |
| 5,081,847 A * | 1/1992 | Anderson, Jr. | 62/222 |
| 5,117,873 A * | 6/1992 | Miyakawa et al. | 138/30 |
| 5,133,647 A * | 7/1992 | Herron et al. | 417/312 |
| 5,180,407 A | 1/1993 | DeMarco | |
| 5,183,974 A * | 2/1993 | Wilhelm et al. | 181/0.5 |
| 5,210,382 A * | 5/1993 | Paley et al. | 181/209 |
| 5,215,124 A * | 6/1993 | Hattori et al. | 138/30 |
| 5,475,189 A * | 12/1995 | Field et al. | 181/241 |
| 5,507,159 A * | 4/1996 | Cooksey | 62/503 |
| 5,623,970 A * | 4/1997 | Schuh | 138/40 |
| 5,659,158 A * | 8/1997 | Browning et al. | 181/268 |
| 5,743,298 A * | 4/1998 | Whitesell | 138/31 |
| 5,860,452 A | 1/1999 | Ellis | |
| 5,962,822 A * | 10/1999 | May | 181/264 |
| 6,647,983 B2 * | 11/2003 | Smith et al. | 128/205.24 |
| 6,892,854 B2 | 5/2005 | Wagner et al. | |
| 7,552,521 B2 | 6/2009 | Fink | |
| 2009/0155108 A1* | 6/2009 | Unruh | 417/540 |
| 2009/0191076 A1* | 7/2009 | Deffenbaugh | F04B 39/0055 417/540 |
| 2010/0006370 A1* | 1/2010 | Shaya | 181/268 |
| 2013/0206629 A1 | 8/2013 | Carsten et al. | |

OTHER PUBLICATIONS

International Search Report dated Jan. 21, 2015 in connection with International Application No. PCT/US2014/059758; 2 pages.
Written Opinion of International Searching Authority dated Jan. 21, 2015 in connection with International Application No. PCT/US2014/059758; 4 pages.

* cited by examiner

US 9,790,934 B2

PUMP PULSATION DISCHARGE DAMPENER WITH CURVED INTERNAL BAFFLE AND PRESSURE DROP FEATURE CREATING TWO INTERNAL VOLUMES

CROSS-REFERENCE TO RELATED APPLICATIONS

This application claims priority to U.S. Provisional Patent Application Ser. No. 61/505,451 entitled PUMP PULSATION DISCHARGE DAMPENER WITH CURVED INTERNAL BAFFLE AND PRESSURE DROP FEATURE CREATING TWO INTERNAL VOLUMES and filed on Jul. 7, 2011. The content of the above-identified patent document is hereby incorporated by reference.

TECHNICAL FIELD

The present application relates generally to the operation of reciprocating systems and, more specifically, to providing a pump suction pulsation stabilizer and/or a discharge pulsation dampener with a curved internal baffle having a pressure drop feature such as a choke tube.

BACKGROUND

Reciprocating systems, such as reciprocating pump systems and similar equipment, operate in many types of cyclic hydraulic applications. For example, reciprocating pump systems are used to circulate fluid in many different types of pumping applications. Pressure peaks accelerate the deterioration of the pump, the pump's fluid end expendable parts, and equipment upstream or downstream from the pump with each subsequent pulsation. Failure to control such pressure peaks inevitably affect the operating performance and operational life of the pump, pump fluid end expendable parts and all upstream or downstream components.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump.

In some situations, it is necessary or desirable within a pulsation control device to improve acoustic pulsation energy reduction and/or assimilate a pressure drop that results in some dampening of the high frequency pulsation magnitudes.

There is, therefore, a need in the art for improved pump pulsation control equipment or similar devices used to increase performance and pump life.

SUMMARY

Pulsation control equipment coupled between the inlet or outlet of a reciprocating pump and associated suction or discharge piping and having a generally spherical interior chamber includes a curved baffle with a choke therethrough separating the interior chamber into two volumes and forcing fluid flow through the choke. The effective fluid passage provided by the choke is smaller than the fluid passage for one or both of the inlet to and/or the outlet from the interior chamber. The baffle attenuates pressure pulses within fluid passing through the interior chamber in response to operation of the reciprocating pump, and in particular improves acoustic pulsation energy reduction. The choke dampens high frequency pulsation magnitudes of pressure pulses within fluid passing through the interior chamber in response to operation of the reciprocating pump.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
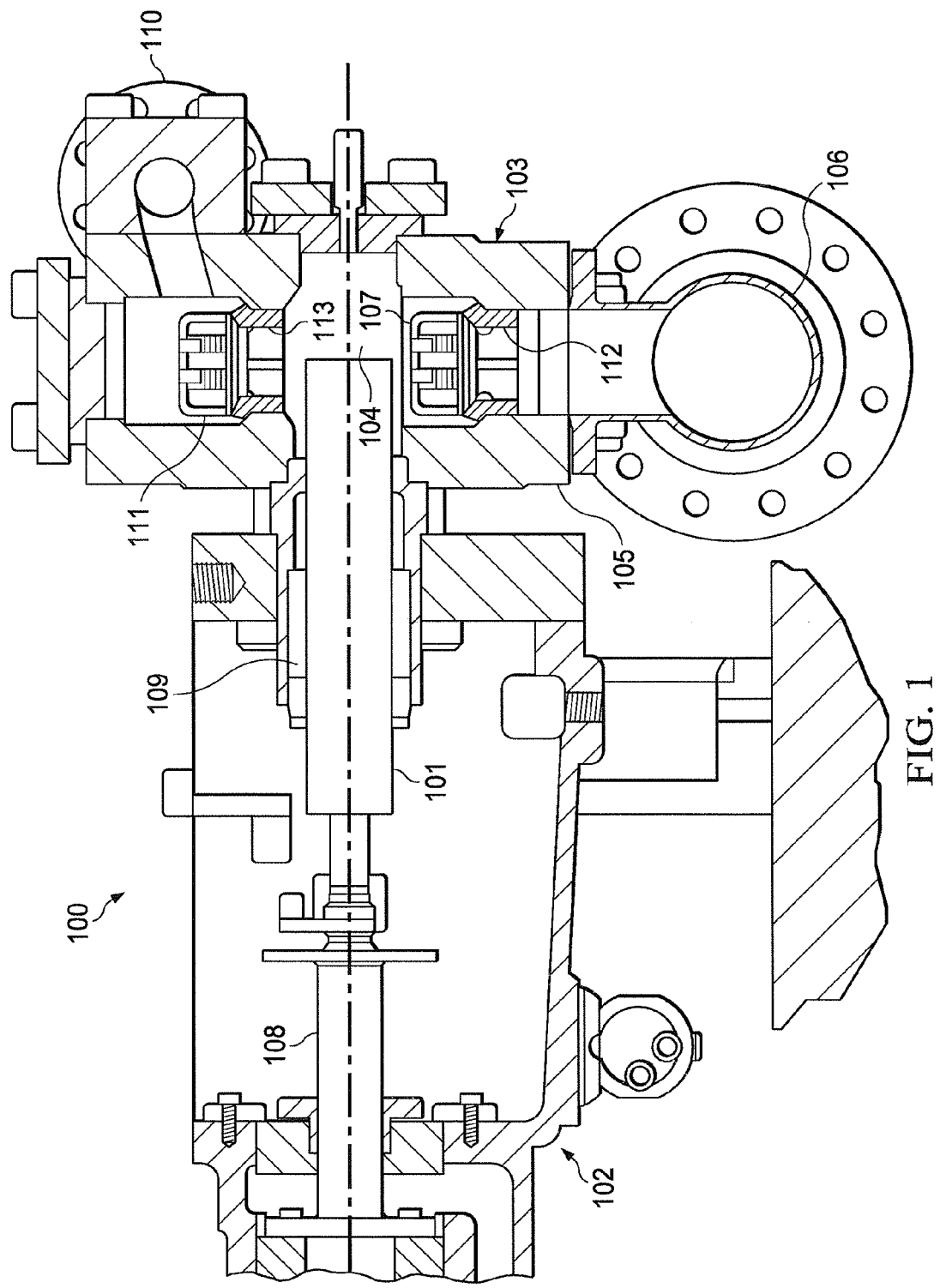
FIG. 1 is a cross sectional, somewhat simplified schematic view of a reciprocating pump system employed with a pump suction and/or discharge pulsation control product including at least a curved internal baffle and associated pressure drop feature creating two internal volumes according to an exemplary embodiment of the present disclosure.
Figure 2:
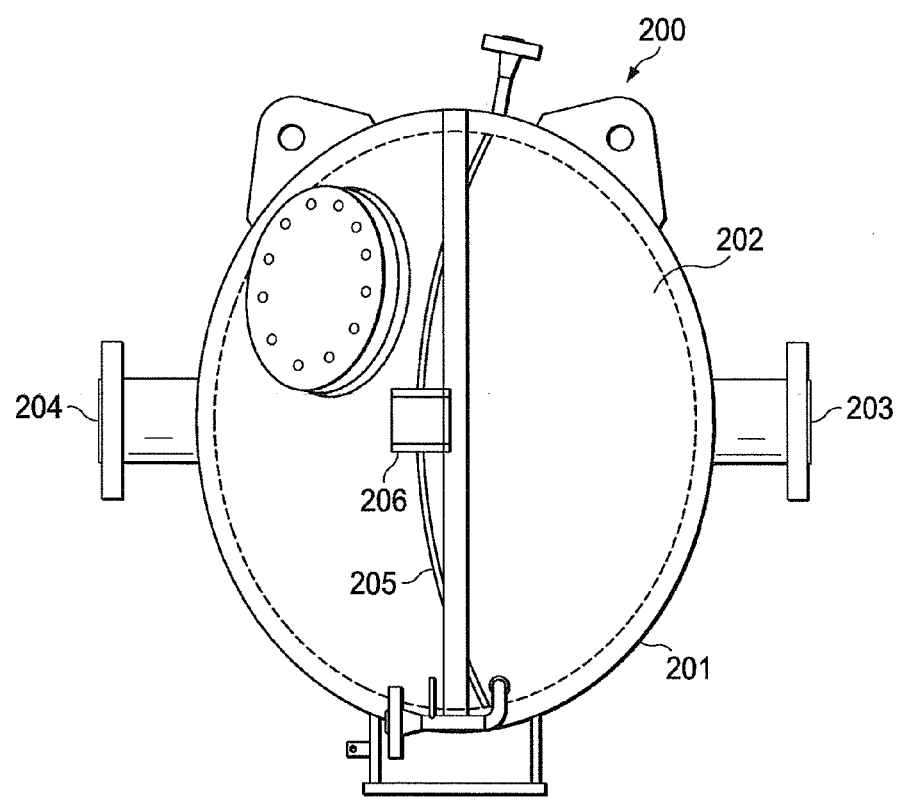
FIG. 2 is a somewhat simplified schematic view of a flow-through pulsation control device according to an exemplary embodiment of the present disclosure.

FIGS. 1 through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged pump discharge dampener that controls or partially controls pulsation amplitudes.

FIG. 1 is a cross sectional, somewhat simplified schematic view of a reciprocating pump system employed with a pump suction and/or discharge pulsation control product including at least a curved internal baffle and associated pressure drop feature creating two internal volumes according to an exemplary embodiment of the present disclosure. Pump system 100 may employ a reciprocating pump of a type well-known and commercially available. The pump within pump system 100 is configured to reciprocate one or more plungers or pistons 101 (only one shown in FIG. 1). Each piston or plunger is preferably connected by a suitable rotatable crankshaft or eccentric (not shown) mounted in a suitable "power end" housing 102. Power end housing 102 is connected to a fluid end structure 103 configured to have a separate pumping chamber 104 for each piston or plunger 101. Pumping chamber 104 is exposed to its respective piston or plunger 101. One such chamber 104 is shown in FIG. 1.

More specifically, FIG. 1 depicts a simplified cross-sectional view through a typical pumping chamber 104. Fluid end 103 includes housing 105. Pumping chamber 104 receives fluid from inlet manifold 106 by way of a conventional poppet type inlet or suction valve 107 (only one shown). Piston or plunger 101 projecting at one end into chamber 104 connects to a suitable crosshead mechanism, including crosshead extension member 108. Crosshead extension member 108 is operably connected to a crankshaft or eccentric (not shown) in a known manner. Piston or plunger 101 also projects through a conventional liner or through conventional packing 109, respectively. Each piston or plunger 101 is preferably configured to chamber 104. Each piston or plunger 101 is also operably connected to suction piping manifold 106 and discharge piping manifold 110 by way of a suitable suction valve 107 or discharge valve 111, as shown. Suction piping manifold 106 typically receives fluid from suction stabilizer (not shown in FIG. 1). Discharge piping manifold 110 typically discharges into a discharge dampener (not shown in FIG. 1). Valves 107 and 111 are of conventional design and typically spring biased to their respective closed positions. Valves 107 and 111 each also may include or be associated with removable valve seat members 112 and 113, respectively. Each of valves 107 and 111 may preferably have a seal member (not shown) formed thereon to provide fluid sealing when the valves are in their respective closed and seat engaging positions.

Those skilled in the art will recognize that the techniques of the present disclosure may be utilized with a wide variety of single and multi-cylinder reciprocating piston or plunger power pumps as well as possibly other types of positive displacement pumps. As in example, the number of cylinders of such pumps may vary substantially between a single cylinder and essentially any number of cylinders or separate pumping chambers. Those skilled in the art will also recognize that the complete structure and operation of a suitable pump system is not depicted or described herein. Instead, for simplicity and clarity, only so much of a pump system as is unique to the present disclosure or necessary for an understanding of the present disclosure is depicted and described.

Conventional pump systems such as pump 100 shown in FIG. 1 typically include intake suction stabilizer and/or discharge pulsation control system(s). FIG. 2 depicts one possible suction stabilizer or discharge pulsation control system 200. The flow-through pulsation control device 200 composed of a spherical or cylindrical shell with at least one inlet and one outlet nozzle permitting fluid entry and eventual exit, and includes an internal curved baffle with a pressure drop feature at a point along the surface thereof permitting fluid entering the inlet to react with fluid contained in the shell on the inlet side of the baffle before passing through the internal pressure drop feature to react with fluid contained within the shell on the outlet side of the baffle.

Pulsation control system 200 has a body 201 with an interior surface forming a substantially annular or spherical interior chamber 202. Discharge dampener system 200 is typically secured to a solid surface, for example, a drill rig floor or pump skid. Pulsation control system 200 receives "fluid" (which may be entirely liquid or which may include suspended solids—i.e., a slurry) at inlet 203. For a suction stabilizer pulsation control system 200, inlet 203 receives fluid from the upstream supply piping system (not shown), becoming temporarily part of the material filling internal volume of chamber 202, and then delivers fluid out through outlet 204 to pump system 100 either directly or by intervening piping (not shown), allowing all pumped fluid to enter pump system 100. Similarly for a discharge pulsation control system 200, inlet 203 is coupled in fluid communication with the discharge manifold 110 of pump system 100 either directly or by intervening piping (not shown), allowing all pumped fluid to enter discharge dampener system 200, becoming temporarily part of the material filling internal volume of chamber 202. All fluid then exits through outlet 204, which directs pumped fluid into an external discharge piping system (not shown).

The pulsation control product 200 dampens or lowers the pulsation amplitudes within fluid pumped through the pump system 100 and external suction and/or discharge piping, and also reduces the higher frequency energies created by the pumping actions. In the exemplary embodiment of the present disclosure, an internal baffle 205 and a choke tube (or other pressure drop device) 206 contribute to dampening of such pulsation amplitudes. The internal baffle 205, which is curved in the embodiment depicted, separates the total volume of the interior chamber 202 within the pulsation dampener 200 into two internal volumes. Pressure pulses within fluid passing through the pulsation dampener (in either direction) are thus attenuated. In particular, acoustic pulsation energy reduction is improved by the presence of the internal baffle 205. Baffle 205 is preferably curved (either convex or concave relative to the inlet 203) regardless of whether the overall shape of pulsation dampener 200 is cylindrical or spherical, but in particular is preferably curved when the body for pulsation dampener 200 is generally spherical.

The internal choke or similar pressure drop device (orifice plate, slotted mandrel, etc.) 206 is a fluid passage within the pulsation dampener 200. In the example depicted, the internal choke 206 is a single annular passage between the two interior volumes formed by baffle 205 within the interior chamber 202. As implied by the name, choke 206 has a smaller inner diameter for fluid passage than either the inlet 203 or the outlet 204. The choke 206 (in the exemplary embodiment) thus attenuates pressure drops within the fluid pumped through the pulsation control product or device, thereby providing some dampening of the high frequency pulsation magnitudes. Although depicted as a single opening located centrally within the baffle 205, choke 206 may alternatively comprise a number of openings distributed at various points on baffle 205, with an aggregate diameter for fluid passage that is less than the inner diameter of either inlet 203 or outlet 204. Of course, choke 206 (or the equivalent pressure drop device) may be located off-center within the baffle.

The presence of a curved internal baffle and a choke internal to the interior 202 of a pulsation control device 200 has been found to improve pulsation dampening within the fluid conducted there through, particularly in generally spherical or cylindrical pulsation dampeners.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A hydraulic pulsation control device, comprising:
an inlet to a body of the hydraulic pulsation control device, the body including an interior chamber;
an outlet from the body in fluid communication with the interior chamber;
a baffle within the interior chamber of the hydraulic pulsation control device, the baffle inhibiting direct fluid flow through the body, separating the interior chamber into first and second volumes, and at least partially dampening high frequency pressure pulses within fluid pumped by reciprocating equipment into the first volume of the interior chamber through the inlet and out from the second volume of the interior chamber through the outlet; and
a pressure drop device comprising an annular portion extending into the second volume and extending through a portion of the baffle at a location within the baffle that is off center relative to a direction transverse to a passage through the pressure drop device, wherein the pressure drop device attenuates pressure drops within fluid pumped through the hydraulic pulsation control device,
wherein a total aggregate diameter for fluid passage through the baffle, including an aggregate fluid passage diameter through the pressure drop device, is smaller than a diameter for a fluid passage for one of the inlet to the body and the outlet from the body.

2. The hydraulic pulsation control device of claim 1, wherein the interior chamber is generally spherical or cylindrical and the baffle is curved.

3. The hydraulic pulsation control device of claim 2, wherein the baffle is concave relative to the inlet.

4. The hydraulic pulsation control device of claim 1, wherein the baffle is convex relative to the inlet.

5. The hydraulic pulsation control device of claim 1, wherein the baffle attenuates pressure pulses within fluid passing through the interior chamber in response to operation of a reciprocating pump.

6. The hydraulic pulsation control device of claim 5, wherein the baffle also improves acoustic pulsation energy reduction.

7. The hydraulic pulsation control device of claim 1, wherein the pressure drop device comprises a choke dampening high frequency pulsation magnitudes of pressure pulses within fluid passing through the interior chamber in response to operation of a reciprocating pump.

8. A hydraulic pulsation control device, comprising:
an inlet to a body of the hydraulic pulsation control device, the body including an interior chamber;
an outlet from the body in fluid communication with the interior chamber;
a baffle within the interior chamber of the hydraulic pulsation control device, the baffle inhibiting direct fluid flow through the body, separating the interior chamber into first and second volumes, and at least partially dampening high frequency pressure pulses within fluid pumped by reciprocating equipment into the first volume of the interior chamber through the inlet and out from the second volume of the interior chamber through the outlet; and
a pressure drop device within a portion of the baffle, the pressure drop device comprising a number of openings each extending through the baffle and distributed at various points on the baffle, wherein the pressure drop device attenuates pressure drops within fluid pumped through the hydraulic pulsation control device,
wherein a total aggregate diameter for fluid passage through the baffle, including an aggregate fluid passage diameter for the number of openings, is smaller than a diameter for fluid passage for one of the inlet and the outlet.

9. The hydraulic pulsation control device of claim 8, wherein the interior chamber is generally spherical or cylindrical and the baffle is curved.

10. The hydraulic pulsation control device of claim 8, wherein the baffle is concave relative to the inlet.

11. The hydraulic pulsation control device of claim 8, wherein the baffle is convex relative to the inlet.

12. The hydraulic pulsation control device of claim 8, wherein the baffle attenuates pressure pulses within fluid passing through the interior chamber in response to operation of a reciprocating pump.

13. The hydraulic pulsation control device of claim 12, wherein the baffle also improves acoustic pulsation energy reduction.

14. The hydraulic pulsation control device of claim 8, wherein the pressure drop device comprises a choke dampening high frequency pulsation magnitudes of pressure pulses within fluid passing through the interior chamber in response to operation of a reciprocating pump.

15. A hydraulic pulsation control device, comprising:
an inlet to a body of the hydraulic pulsation control device, the body including an interior chamber, wherein the interior chamber is generally spherical;
an outlet from the body in fluid communication with the interior chamber;
a baffle within the interior chamber of the hydraulic pulsation control device, the baffle inhibiting direct fluid flow through the body, separating the interior chamber into first and second volumes, and at least partially dampening high frequency pressure pulses within fluid pumped by reciprocating equipment into the first volume of the interior chamber through the inlet and out from the second volume of the interior chamber through the outlet, wherein the baffle is curved and the body of the hydraulic pulsation control device is spherical; and
a pressure drop device within a portion of the baffle, the pressure drop device having a single fluid passage comprising an annular portion extending into the second volume, wherein the pressure drop device attenuates pressure drops within fluid pumped through the hydraulic pulsation control device,
wherein a total aggregate diameter for fluid passage through the baffle, including an aggregate fluid passage diameter for the single fluid passage, is smaller than a fluid passage diameter of a fluid passage for the outlet.

16. The hydraulic pulsation control device of claim 15, wherein the baffle is concave relative to the inlet.

17. The hydraulic pulsation control device of claim 15, wherein the baffle is convex relative to the inlet.

18. The hydraulic pulsation control device of claim 15, wherein the baffle attenuates pressure pulses within fluid passing through the interior chamber in response to operation of a reciprocating pump.

19. The hydraulic pulsation control device of claim 18, wherein the baffle also improves acoustic pulsation energy reduction.

20. The hydraulic pulsation control device of claim 15, wherein the pressure drop device comprises a choke dampening high frequency pulsation magnitudes of pressure pulses within fluid passing through the interior chamber in response to operation of a reciprocating pump.

* * * * *